United States Patent [19]
Chen et al.

[11] Patent Number: 6,118,901
[45] Date of Patent: Sep. 12, 2000

[54] ARRAY ARCHITECTURE WITH DATA-RINGS FOR 3-STEP HIERARCHICAL SEARCH BLOCK MATCHING ALGORITHM

[75] Inventors: Liang-Gee Chen; Yeong-Kang Lai, both of Taipei Hsien; Yuan-Chen Liu, Taipei; Yung-Pin Lee, Taipei Hsien, all of Taiwan

[73] Assignee: National Science Council, Taipei, Taiwan

[21] Appl. No.: 08/960,526

[22] Filed: Oct. 31, 1997

[51] Int. Cl.[7] .................. G06K 9/36; H04N 7/12; H04N 5/14

[52] U.S. Cl. .................. 382/236; 382/234; 348/407; 348/699

[58] Field of Search .................. 348/412, 413, 348/416, 420, 402, 407, 409, 415, 430, 431, 699, 700, 701; 382/236, 232, 234

[56] References Cited

U.S. PATENT DOCUMENTS

| | | | |
|---|---|---|---|
| 5,099,325 | 3/1992 | Artieri et al. | 348/420 |
| 5,475,446 | 12/1995 | Yamada et al. | 348/699 |
| 5,568,203 | 10/1996 | Lee | 348/699 |
| 5,585,862 | 12/1996 | Wuertele et al. | 348/699 |
| 5,636,293 | 6/1997 | Lin et al. | 382/236 |
| 5,706,059 | 1/1998 | Ran et al. | 348/699 |

*Primary Examiner*—Thomas D. Lee
*Assistant Examiner*—Wenpeng Chen
*Attorney, Agent, or Firm*—Merchant & Gould P.C.

[57] ABSTRACT

The invention discloses a 9-cell array architecture with data-rings for 3-step hierarchical search (3SHS) block-matching algorithm. With the efficient data-rings and memory organization, the regular raster-scanned data flow and comparator tree-like structure can be used to simply internal I/O controller and reduce latency. In addition, we can utilize techniques to reduce external memory accesses and interconnections. The results demonstrate that the array architecture with the data-rings is low in terms of latency, memory bandwidth and costs and a high performance solution for the 3 SHS.

1 Claim, 8 Drawing Sheets

ARRAY ARCHITECTURE WITH DATA-RINGS FOR 3-STEP HIERARCHICAL SEARCH BLOCK MATCHING ALGORITHM

FIELD OF THE INVENTION

The invention relates to an array architecture with data-rings, and more particularly, to an array architecture with data-rings for motion estimating in video compression.

BACKGROUND OF THE INVENTION

Video applications are widely used recently and thus image and video compression techniques become an important issue of the modern telecommunication and storage mediums. More and more consumer electronic products, such as video telephone, video conference, HDTV and video on demand (VOD), need data compression techniques to reduce the transmission and storage data volume so as to meet the I/O bandwidth and obtain higher quality. Currently video compression standards, such as H.263, MPEG-1 and MPEG-2, all adopt motion estimation as part of the compression steps thereof. As the data volume is increased, a quick and efficient motion estimation hardware is needed to improve the performance of the video compression technique and reduce the temporal redundancy within frame sequences. Especially when the data volume of HDTV is more and more increased, a high performance and high computation motion estimator is needed to meet such a requirement.

Block matching algorithm is widely adopted in motion estimation. Full search algorithm can preferably find the exactly position of the block and obtain a superior video quality. However, it requires a large amount of computation and time. Therefore, fast search algorithms are developed to remove the drawbacks, such as extremely high computational complexity, of the full search algorithm. Among all the fast search algorithms, the 3-step hierarchical search block matching algorithm (3SHS) is considered as one of the best algorithms. Though the image quality obtained by the fast search algorithm is inferior to that of the full search algorithm, the amount of the computation is significantly reduced to $\frac{1}{10}$.

Most of the conventional motion estimators focus on the hardware design of the full search algorithm because of its regular data flow, low control overhead and control complexity. Besides, currently hardware design of the 3-step search algorithm does not efficiently consider its irregular data flow and access characteristics of the memory. Therefore, the latency, bandwidth and cost are not satisfactory.

SUMMARY OF THE INVENTION

In view of the above-mentioned drawbacks of the prior art, it is an object of the invention to provide a novel and high performance array architecture with data-rings for 3-step hierarchical search block matching algorithm so as to increase the motion estimating efficiency.

It is another object of the invention to provide an array architecture with data-rings for 3-step hierarchical search block matching algorithm which has advantages of low latency, bandwidth and cost.

It is a further object of the invention to utilize the characteristics of the 3-step search algorithm to develop an efficient 9-cells array architecture with data-rings. Efficient data-rings and memory organization can enable the data to be operated fluently. Therefore, the architecture of the invention not only simplifies the internal I/O controller with a regular raster-scanned data flow but also shorten the latency by using a comparator tree-like structure. In addition, the techniques for reducing external memory access and interconnections can be applied to the architecture.

BRIEF DESCRIPTION OF THE DRAWINGS

For a more complete understanding of the present invention and the advantages thereof, reference is now made to the following descriptions taken in conjunction with the accompanying drawings which illustrate one or more embodiments of the present invention.

FIGS. 5(*a*), 5(*b*) and 5(*c*) illustrate the distribution of search area pixels to 9 memory modules and the memory interleaving instances for 3-step;

FIGS. 8(*a*) and 8(*b*) illustrate the memory module being divided into three HSA (Half-Search-Area) segments and the HSA access manner for block matching.

DETAILED DESCRIPTION OF THE INVENTION

The searching procedure of the 3-step hierarchical search block matching algorithm is illustrated as follows. Supposing the horizontal and vertical search areas of the reference block is in the range of −7 to 7. After three steps searching, the optimum macro-block is the candidate block with the minimum mean absolute difference. The procedure comprises the following steps:

Step 1. The 9 N×N candidate block locations of the search area in the previous frame are matched against the N×N reference block in the current frame (as the locations label "1" in FIG. 1, the invention uses the pixel data at the top-left corner of the candidate block to represent the location of the candidate block, computing the MAD of the 9 candidate blocks to extract the location of the minimum MAD)

Step 2. Utilizing the candidate block location with the minimum MAD of Step 1 as the center of the search area and shortening search area by half. Computing the MAD of the 9 candidate blocks (as locations labeled "2" in FIG. 1) to extract the location of the minimum MAD.

Figure 1:
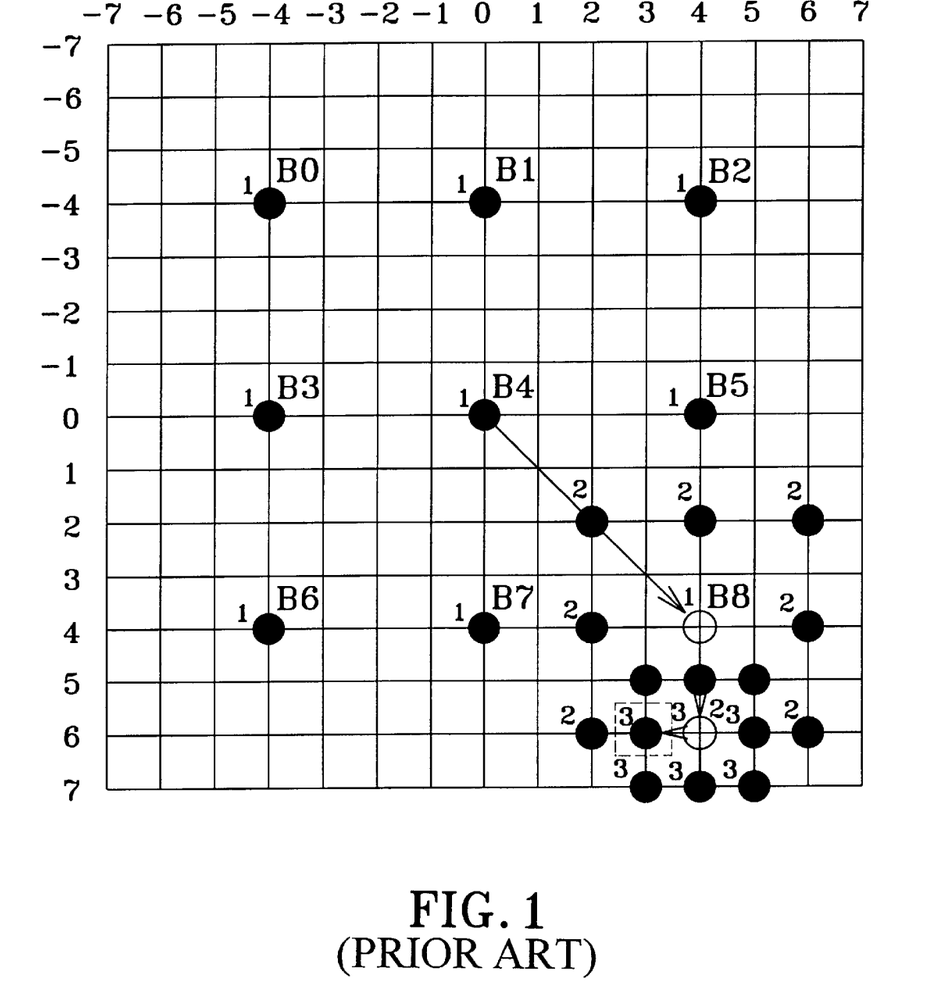
FIG. 1 illustrates the scheme of 3-step hierarchical search block matching algorithm.

Step 3. Utilizing the candidate block location with the minimum MAD of Step 2 as the center of the search area and shortening search area by half. Computing the MAD of the 9 candidate blocks (as locations labeled "3" in FIG. 1) to extract the location of the minimum MAD. The location of the minimum MAD is the location of the optimum macro-block. The motion vector (3,6), as shown in FIG. 1, is thus obtained.

Figure 2:
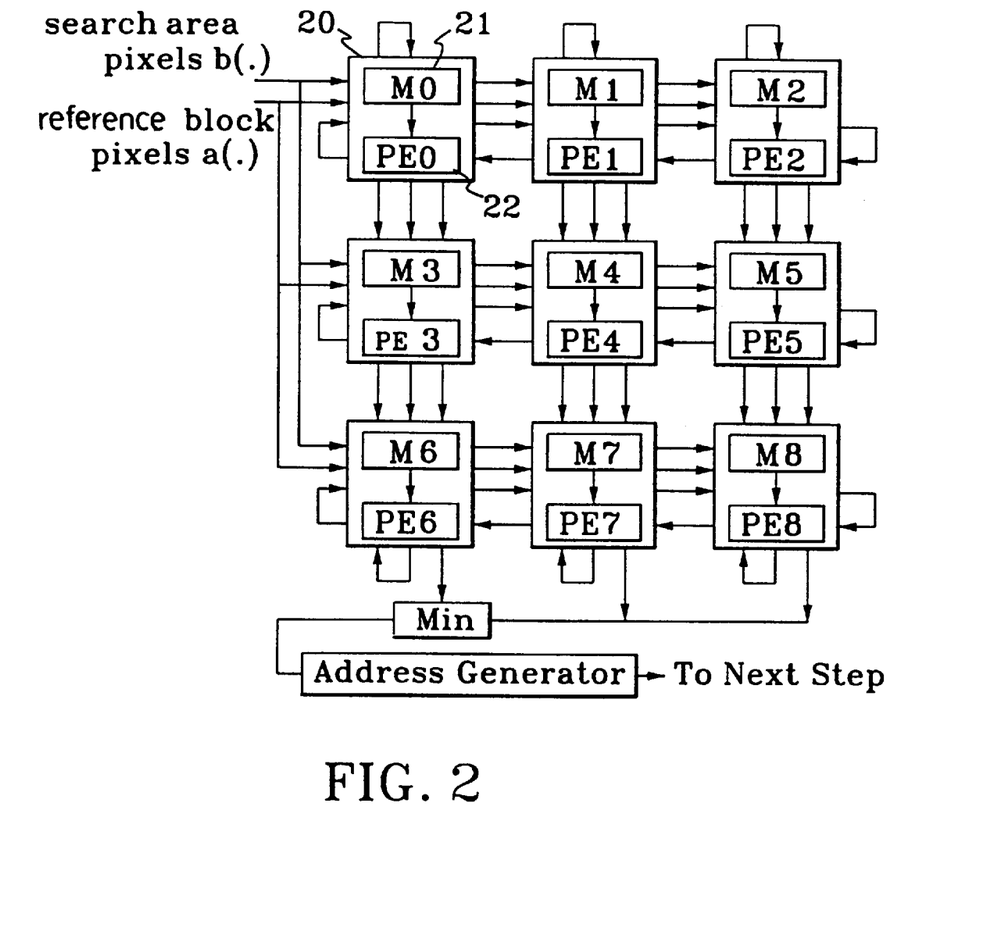
FIG. 2 illustrates the 9-cells array architecture with data-rings of the invention.
Figure 3:
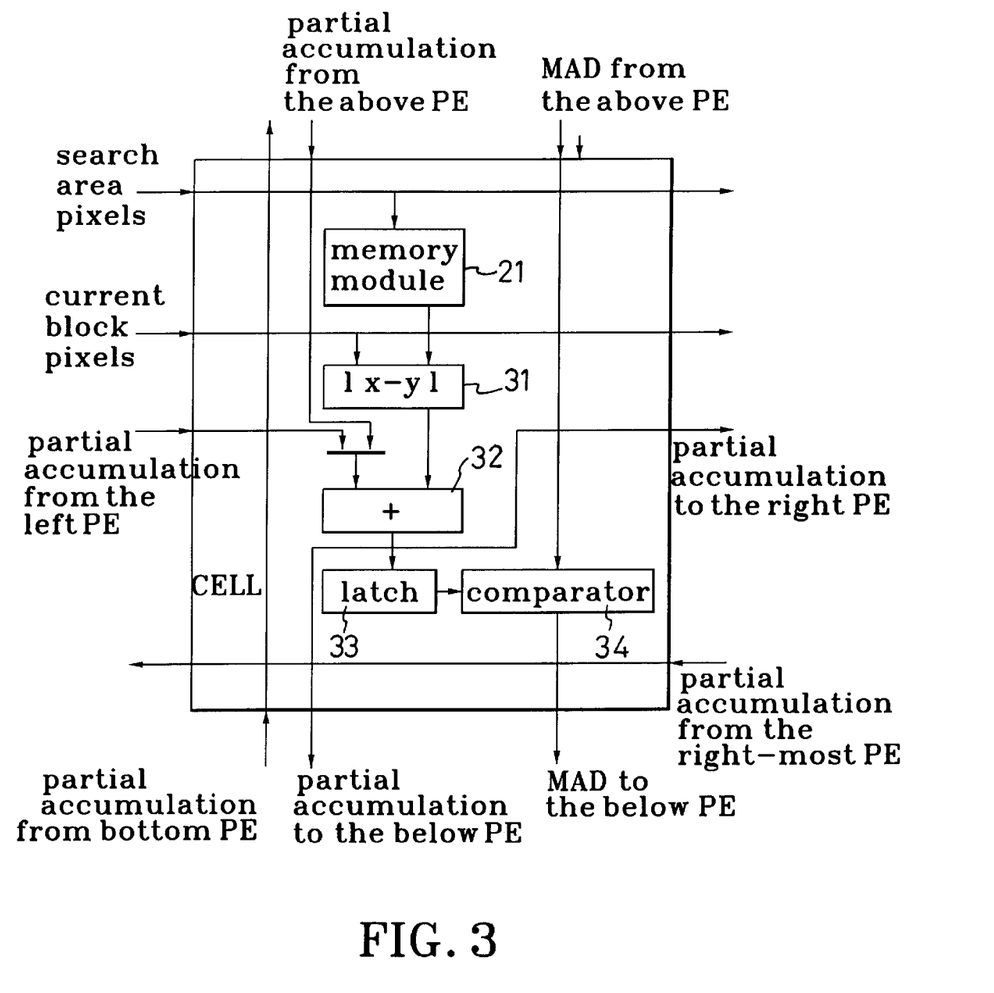
FIG. 3 illustrates the cell architecture of the 9-cells array architecture with data-rings of the invention.
Figure 4:
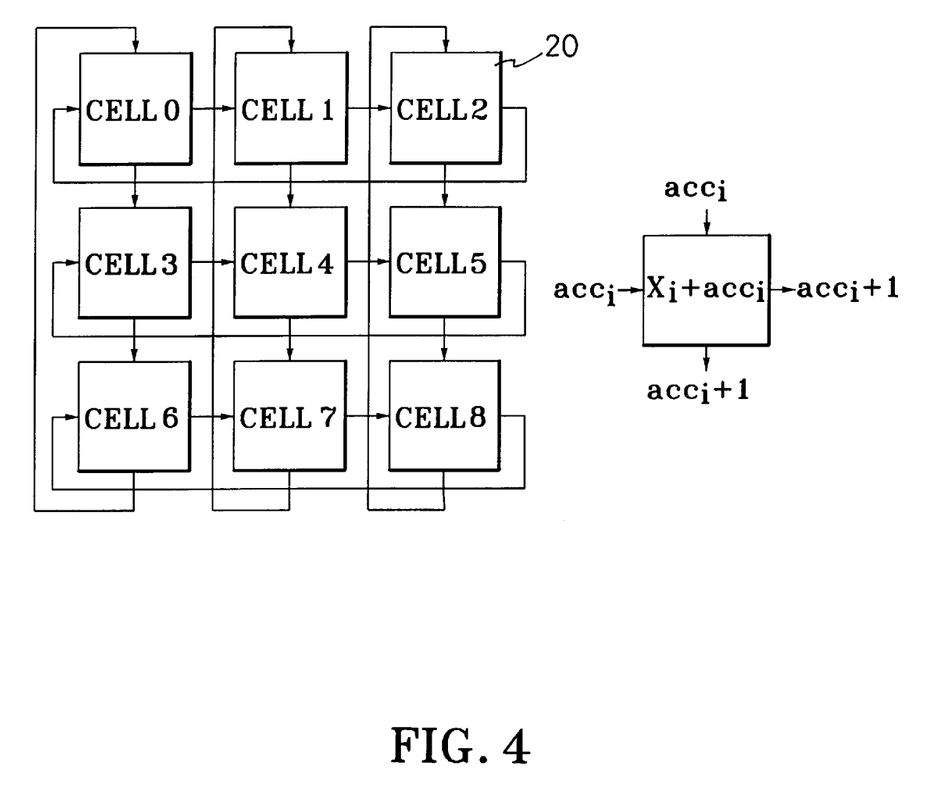
FIG. 4 illustrates the ring-like architecture of the processing element of the cells in the 9-cells array architecture with data-rings of the invention.

Considering the cost of control scheme, latency and data access, the invention discloses a 9-cell array architecture with data-rings which evaluates the 9 candidate block locations in parallel and accumulates the absolute pixel difference of each candidate block matching sequentially in a raster-scanned manner. FIG. 2 illustrates the 9-cells array architecture with data-rings of the invention, wherein each cell 20 consists of a memory module 21 and a processing element (PE) 22. The output of the memory module 21 is connected to the input of the processing element 22. The processing element 22 comprises an absolute difference unit 31, an accumulator 32, a final result latch 33 and a comparator 34 (as shown in FIG. 3). However, the top three cells 20 do not comprise the comparator 34. The processing elements 22 are connected in horizontal rings and vertical rings, i.e. the output of the accumulator 32 in the processing element 22 is connected to the input of the processing elements 22 at the right-hand side and the below side (as shown in FIG. 4). Therefore, the partial accumulation in the accumulator 32 can be shifted and accumulated among the processing elements 22 in a horizontal and vertical ringed manner. The reference block pixels are sequentially input to all processing elements in a raster-scanned order. For example, a (3×3) pixel block is shown below:

| a(0,0) | a(0,1) | a(0,2) |
| a(1,0) | a(1,1) | a(1,2) |
| a(2,0) | a(2,1) | a(2,2) |

It means that the block pixels are read in order of a(0,0), a(0,1), a(0,2), a(1,0), a(1,1), a(1,2), a(2,0), a(2,1) and a(2,2).

Figure 5A:
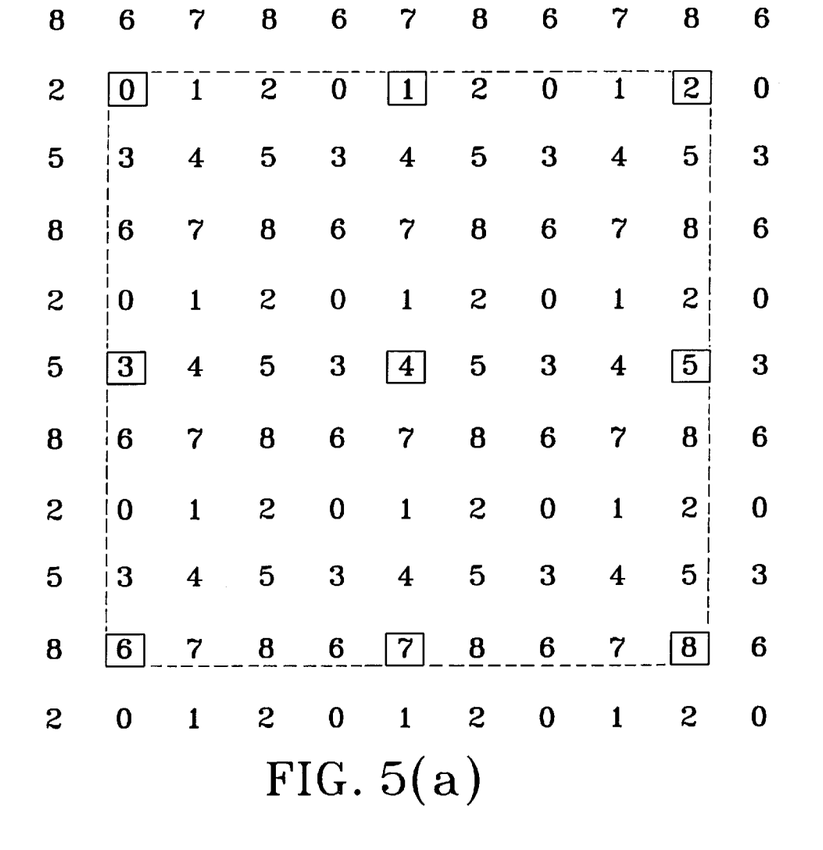
Figure 5B:
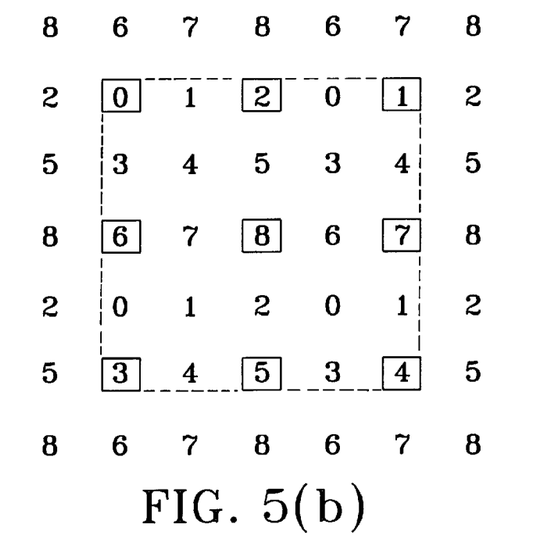
Figure 5C:
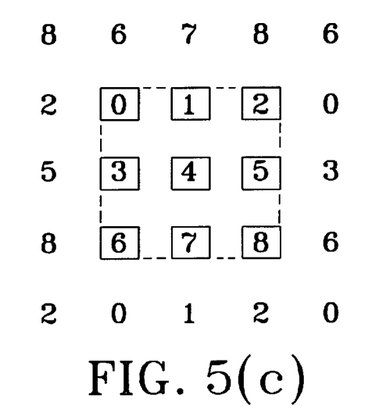

The memory interleaving technique is also utilized in the architecture of the invention. The search area pixels are interleaved to the 9 memory modules 21 so that the 9 processing elements 22 can parallel read the pixels in the memory modules 21. FIG. 5 illustrates the distribution of the search area pixels to 9 memory modules 21. The label (0–8) for each pixel indicates the index of the memory module 21 that stores the pixel. If each processing element 22 is fixed to compute a certain candidate block location, the 9 processing elements 22 have to read 9 individual candidate pixels from the 9 memory modules 21. For example, PE0 performs all the operations required to find the MAD of candidate location B0, and the B0 pixels are distributed to the 9 memory modules 21. Therefore, the operation performed with all pixels from each memory module 21 with the reference block pixel is necessary. Though the approach is straightforward, it suffers high interconnection and switching overhead. To overcome this drawback, the invention rearranges the data flow from memory module 21 to processing elements 22 so that the MAD operation of the same candidate block location can be alternatively performed by the 9 processing elements 22. Since the processing elements 22 are connected in horizontal rings and vertical rings, it makes partial accumulation data can be shifted and accumulated between the two adjacent processing elements 22 in a horizontal or a vertical ringed manner. Therefore, each processing element 22 may alternatively calculate partial accumulations of different candidate locations at different cycles. By using the ringed transfer of the partial accumulation, each processing element 22 only connects to one memory module 21 and thus the complicated switching circuitry and interconnection are eliminated.

Figure 6:
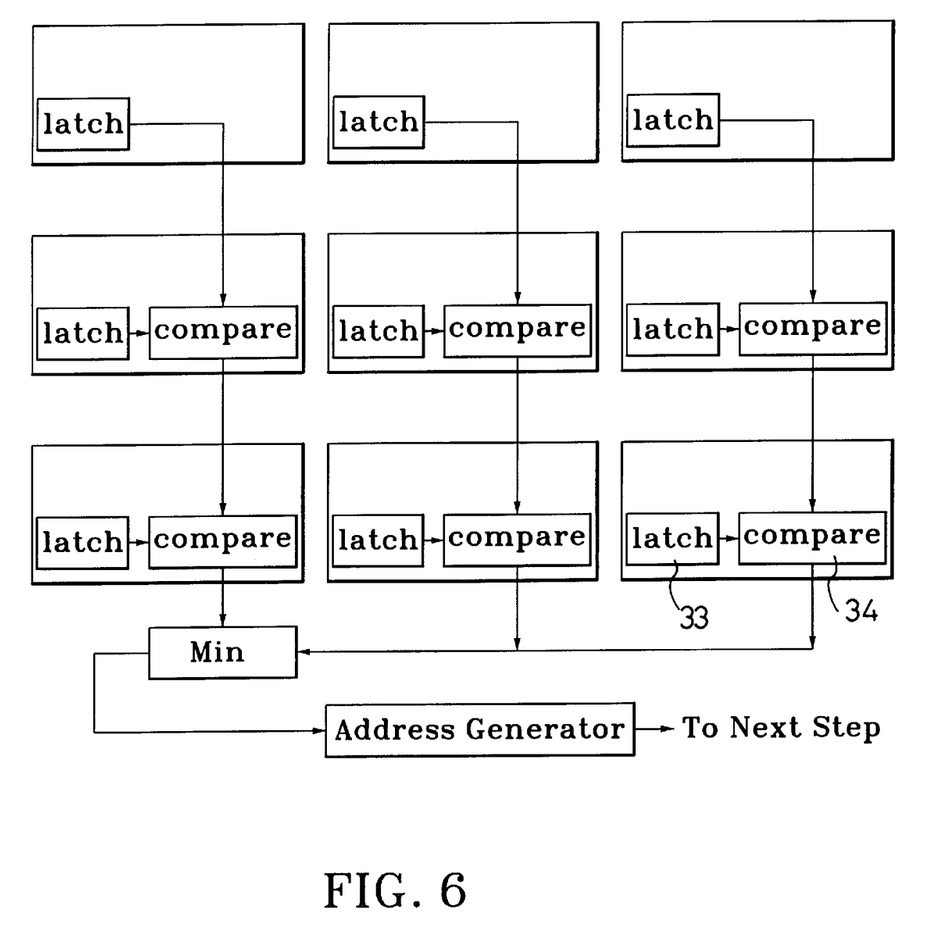
FIG. 6 illustrates the comparator tree-like architecture for extracting the minimum mean absolute difference (MAD)

Tables 1 and 2 illustrate the whole data flow of each step of the 3-step hirarchical search block matching algorithm by showing every processing element's 22 corresponding candidate locations at different clock cycles. Referring to FIGS. 2 and 3, the operation of the architecture for the block-size of 16×16 and search range of −7 to 7 can be explained as follows. At each clock cycle, the reference block pixels a(.) are sequentially broadcasted to all processing elements 22 in a raster-scanned order. Partial accumulations are all accumulated in a horizontal ringed direction. After every 16 clock cycles, each partial accumulation shifts and accumulates in a vertical ringed direction. After every 256 clock cycles, the final accumulation result of each candidate block location is produced in the final result latch 33 of each processing element 22. Then the architecture takes 4 clock cycles to sent 9 latched MADs to the comparator-tree to get a minimum MAD (as shown in FIG. 6). Finally, the architecture takes 1 clock cycle to decide the 9 candidate block locations in the next step. Therefore, the architecture takes (256+4+1)×3=783 clock cycles to obtain the motion vector of a reference block.

TABLE 1

| Cycle time | Data Sequence | PE0 | PE1 | PE2 | PE3 | PE4 | PE5 | PE6 | PE7 | PE8 |
| --- | --- | --- | --- | --- | --- | --- | --- | --- | --- | --- |
| 0 × 16 + 0 | a(0,0) | B0 | B1 | B2 | B3 | B4 | B5 | B6 | B7 | B8 |
| 0 × 16 + 1 | a(0,1) | B2 | B0 | B1 | B5 | B3 | B4 | B8 | B6 | B7 |
| 0 × 16 + 2 | a(0,2) | B1 | B2 | B0 | B4 | B5 | B3 | B7 | B8 | B6 |
| 0 × 16 + 3 | a(0,3) | B0 | B1 | B2 | B3 | B4 | B5 | B6 | B7 | B8 |
| 0 × 16 + 4 | a(0,4) | B2 | B0 | B1 | B5 | B3 | B4 | B8 | B6 | B7 |
| 0 × 16 + 5 | a(0,5) | B1 | B2 | B0 | B4 | B5 | B3 | B7 | B8 | B6 |
| 0 × 16 + 6 | a(0,6) | B0 | B1 | B2 | B3 | B4 | B5 | B6 | B7 | B8 |
| 0 × 16 + 7 | a(0,7) | B2 | B0 | B1 | B5 | B3 | B4 | B8 | B6 | B7 |
| 0 × 16 + 8 | a(0,8) | B1 | B2 | B0 | B4 | B5 | B3 | B7 | B8 | B6 |
| 0 × 16 + 9 | a(0,9) | B0 | B1 | B2 | B3 | B4 | B5 | B6 | B8 | B8 |
| 0 × 16 + 10 | a(0,10) | B2 | B0 | B1 | B5 | B3 | B4 | B8 | B6 | B7 |
| 0 × 16 + 11 | a(0,11) | B1 | B2 | B0 | B4 | B5 | B3 | B7 | B8 | B6 |
| 0 × 16 + 12 | a(0,12) | B0 | B1 | B2 | B3 | B4 | B5 | B6 | B7 | B8 |
| 0 × 16 + 13 | a(0,13) | B2 | B0 | B1 | B5 | B3 | B4 | B8 | B6 | B7 |
| 0 × 16 + 14 | a(0,14) | B1 | B2 | B0 | B4 | B5 | B3 | B7 | B8 | B6 |
| 0 × 16 + 15 | a(0,15) | B0 | B1 | B2 | B3 | B4 | B5 | B6 | B7 | B8 |
| 1 × 16 + 0 | a(1,0) | B6 | B7 | B8 | B0 | B1 | B2 | B3 | B4 | B5 |
| 1 × 16 + 1 | a(1,1) | B8 | B6 | B7 | B2 | B0 | B1 | B5 | B3 | B4 |
| ... | ... | ... | ... | ... | | ... | | | ... | ... |
| ... | ... | ... | ... | ... | | ... | | | ... | ... |
| ... | ... | ... | ... | ... | | ... | | | ... | ... |
| 1 × 16 + 14 | a(1,14) | B7 | B8 | | | ... | | | B5 | B3 |
| 1 × 16 + 15 | a(1,15) | B6 | B7 | | | ... | | | B4 | B5 |

TABLE 1-continued

| Cycle time | Data Sequence | PE0 | PE1 | PE2 | PE3 | PE4 | PE5 | PE6 | PE7 | PE8 |
|---|---|---|---|---|---|---|---|---|---|---|
| ... | ... | ... | ... | | | ... | | | ... | ... |
| ... | ... | ... | ... | | | ... | | | ... | ... |
| ... | ... | ... | ... | | | ... | | | ... | ... |
| 14 × 16 + 0 | a(14,0) | B3 | B4 | | | ... | | | B1 | B2 |
| 14 × 16 + 1 | a(14,1) | B5 | B3 | | | ... | | | B0 | B1 |
| ... | ... | ... | ... | | | ... | | | ... | ... |
| ... | ... | ... | ... | | | ... | | | ... | ... |
| ... | ... | ... | ... | | | ... | | | ... | ... |
| 14 × 16 + 14 | a(14,14) | B4 | B5 | | | ... | | | B2 | B0 |
| 14 × 16 + 15 | a(14,15) | B3 | B4 | | | ... | | | B1 | B2 |
| 15 × 16 + 0 | a(15,0) | B0 | B1 | | | ... | | | B7 | B8 |
| 15 × 16 + 1 | a(15,1) | B2 | B0 | | | ... | | | B6 | B7 |
| ... | ... | ... | ... | | | ... | | | ... | ... |
| ... | ... | ... | ... | | | ... | | | ... | ... |
| ... | ... | ... | ... | | | ... | | | ... | ... |
| 15 × 16 + 14 | a(15,14) | B1 | B2 | | | ... | | | B8 | B6 |
| 15 × 16 + 15 | a(15,15) | B0 | B1 | | | ... | | | B7 | B8 |

TABLE 2

| Cycle time | Data Sequence | PE0 | PE1 | PE2 | PE3 | PE4 | PE5 | PE6 | PE7 | PE8 |
|---|---|---|---|---|---|---|---|---|---|---|
| 0 × 16 + 0 | a(0,0) | B0 | B2 | B1 | B6 | B8 | B7 | B3 | B5 | B4 |
| 0 × 16 + 1 | a(0,1) | B1 | B0 | B2 | B7 | B6 | B8 | B4 | B3 | B5 |
| 0 × 16 + 2 | a(0,2) | B2 | B1 | B0 | B8 | B7 | B6 | B5 | B4 | B3 |
| 0 × 16 + 3 | a(0,3) | B0 | B2 | B1 | B6 | B8 | B7 | B3 | B5 | B4 |
| 0 × 16 + 4 | a(0,4) | B1 | B0 | B2 | B7 | B6 | B8 | B4 | B3 | B5 |
| 0 × 16 + 5 | a(0,5) | B2 | B1 | B0 | B8 | B7 | B6 | B5 | B4 | B3 |
| 0 × 16 + 6 | a(0,6) | B0 | B2 | B1 | B6 | B8 | B7 | B3 | B5 | B4 |
| 0 × 16 + 7 | a(0,7) | B1 | B0 | B2 | B7 | B6 | B8 | B4 | B3 | B5 |
| 0 × 16 + 8 | a(0,8) | B2 | B1 | B0 | B8 | B7 | B6 | B5 | B4 | B3 |
| 0 × 16 + 9 | a(0,9) | B0 | B2 | B1 | B6 | B8 | B7 | B3 | B5 | B4 |
| 0 × 16 + 10 | a(0,10) | B1 | B0 | B2 | B7 | B6 | B8 | B4 | B3 | B5 |
| 0 × 16 + 11 | a(0,11) | B2 | B1 | B0 | B8 | B7 | B6 | B5 | B4 | B3 |
| 0 × 16 + 12 | a(0,12) | B0 | B2 | B1 | B6 | B8 | B7 | B3 | B5 | B4 |
| 0 × 16 + 13 | a(0,13) | B1 | B0 | B2 | B7 | B6 | B8 | B4 | B3 | B5 |
| 0 × 16 + 14 | a(0,14) | B2 | B1 | B0 | B8 | B7 | B6 | B5 | B4 | B3 |
| 0 × 16 + 15 | a(0,15) | B0 | B2 | B1 | B6 | B8 | B7 | B3 | B5 | B4 |
| 1 × 16 + 0 | a(1,0) | B3 | B5 | B4 | B0 | B2 | B1 | B6 | B8 | B7 |
| 1 × 16 + 1 | a(1,1) | B4 | B3 | B5 | B1 | B0 | B2 | B7 | B6 | B8 |
| ... | ... | ... | ... | | | ... | | | ... | ... |
| ... | ... | ... | ... | | | ... | | | ... | ... |
| ... | ... | ... | ... | | | ... | | | ... | ... |
| 1 × 16 + 14 | a(1,14) | B5 | B4 | | | ... | | | B7 | B6 |
| 1 × 16 + 15 | a(1,15) | B3 | B5 | | | ... | | | B8 | B7 |
| ... | ... | ... | ... | | | ... | | | ... | ... |
| ... | ... | ... | ... | | | ... | | | ... | ... |
| ... | ... | ... | ... | | | ... | | | ... | ... |
| 14 × 16 + 0 | a(14,0) | B6 | B8 | | | ... | | | B2 | B1 |
| 14 × 16 + 1 | a(14,1) | B7 | B6 | | | ... | | | B0 | B2 |
| ... | ... | ... | ... | | | ... | | | ... | ... |
| ... | ... | ... | ... | | | ... | | | ... | ... |
| ... | ... | ... | ... | | | ... | | | ... | ... |
| 14 × 16 + 14 | a(14,14) | B8 | B7 | | | ... | | | B1 | B0 |
| 14 × 16 + 15 | a(14,15) | B6 | B8 | | | ... | | | B2 | B1 |
| 15 × 16 + 0 | a(15,0) | B0 | B2 | | | ... | | | B5 | B4 |
| 15 × 16 + 1 | a(15,1) | B1 | B0 | | | ... | | | B3 | B5 |
| ... | ... | ... | ... | | | ... | | | ... | ... |
| ... | ... | ... | ... | | | ... | | | ... | ... |
| ... | ... | ... | ... | | | ... | | | ... | ... |
| 15 × 16 + 14 | a(15,14) | B2 | B1 | | | ... | | | B4 | B3 |
| 15 × 16 + 15 | a(15,15) | B0 | B2 | | | ... | | | B5 | B4 |

Figure 7:
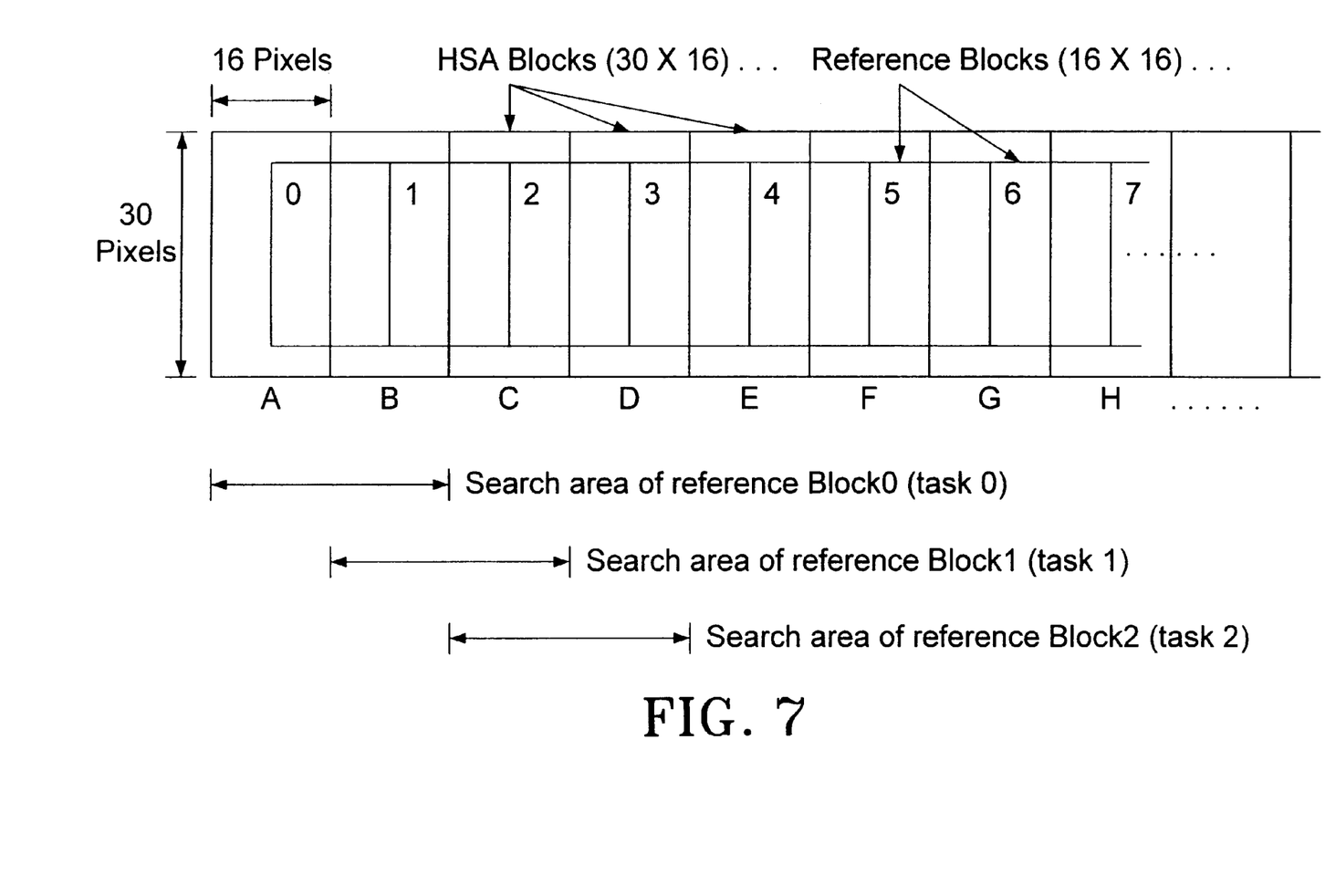
FIG. 7 illustrates the overlapped scheme of the search area of the adjacent reference block.
Figure 8A:
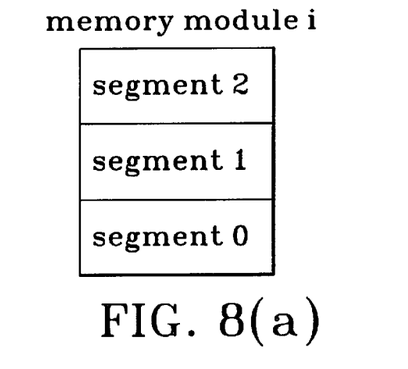
Figure 8B:
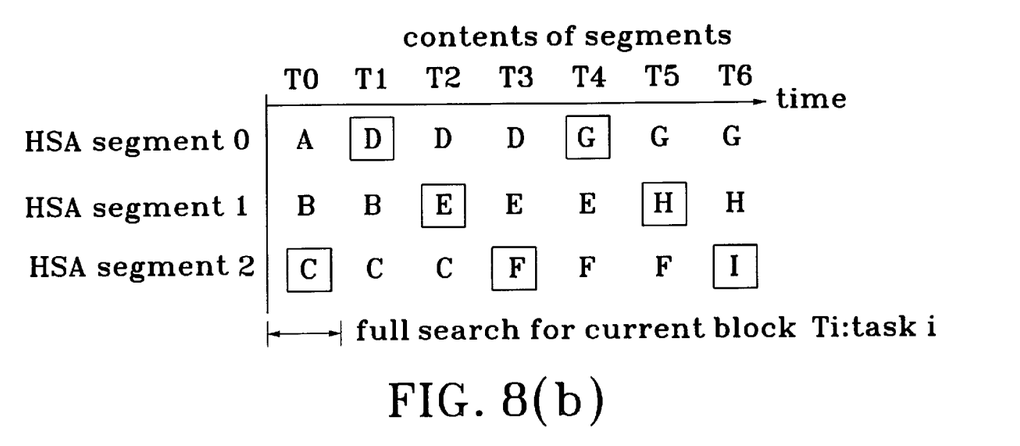

About half of the search areas of the adjacent reference blocks overlap. To avoid the extremely high memory bandwidth and large input ports, the original three half-search-area (HSA) scheme are utilized in this architecture (as shown in FIG. 7). The architecture divides each memory module 21 into three HSA segments (as shown in FIG. 8a), each HSA segment stores half search area block (HSA Block, 30×16 pixels). FIG. 8b illustrates the operation procedure. As shown in FIGS. 8a and 8b, HSA A and HSA B are respectively stored in HSA segment 0 and HSA segment 1 before task 0 is performed. During performing task 0, i.e. performing reference block 0 matching, processing element 22 reads search area pixels from HSA segment 0 and HSA segment 1. Meanwhile, the right-half pixels of the search area are stored into HSA segment 2. Then performing task 1, search area pixels are read from HSA segment 1 and HSA segment 2 and HSA D is stored into HSA segment 0. In this cyclic manner, the architecture only needs two input ports. One is for the reference block pixel and the other one is for search area pixel.

The architecture disclosed in the invention obtains a better balance between the throughput and the number of the processing element 22. With the regular raster-scanned data flow and the efficient data-rings, the throughput is increased. On the other hand, the input bandwidth and the input ports are reduced by the built-in memory modules 21. The performance of the architecture of the invention is shown in Table 3.

TABLE 3

|  | Proposed Architecture |
|---|---|
| Input Data Ports | 16 |
| No. of the used Processing Elements | 9 |
| Clock Cycles per Block Matching | 783 |
| Throughput | 1/783 |
| Throughput/No. of the used PEs | 1/7047 |

In conclusion, the invention firstly discloses a novel 9-cell array architecture with data-rings. The disclosed architecture can circularly accumulate data in the horizontal and vertical directions. The architecture of the invention is different from those of the conventional full search algorithms. Therefore, the invention has novelty. Besides, the architecture of the invention has efficient data-rings and memory organization and thus the invention has advantages of low latency, low memory bandwidth, low cost and high efficiency. Therefore, the invention has inventive step. In addition, the architecture of the invention can be applied to the motion estimator, the most important portion of video compression, and consumer electronic products such as video telephone, HDTV and VOD. Therefore, the invention has industrial applicability.

Although the present invention and its advantage have been described in detail, it should be understood that various changes, substitutions and alternations can be made herein without departing from the spirit and scope of the invention as defined by the appended claims.

What is claimed is:

1. An array architecture with data rings for a 3-step hierarchical search block matching algorithm, comprising:

a plurality of cells each having a memory module and a processing element having an absolute difference unit, an accumulator, a latch and a comparator;

wherein said cells are arranged in an array, said comparators of said processing elements are connected in a tree-like manner and said processing elements of said cells are connected in horizontal rings and vertical rings for processing the mean absolute difference and mean square difference operations; and wherein reference block pixels are broadcast into said processing elements in a raster-scanned order and pixels in said memory modules are simultaneously read by said processing elements in an interleaving manner;

whereby partial accumulation of each candidate location can be shifted or accumulated among said processing elements in N horizontal circular shifts and N vertical circular shifts, wherein N×N is the block size of the reference block, to process the data flow of the 3-step hierarchical search block matching algorithm.

* * * * *